May 16, 1950  H. C. KRAPF ET AL  2,508,175
ELECTRIC MOTOR DYNAMIC BRAKING SYSTEM
Filed Nov. 13, 1946
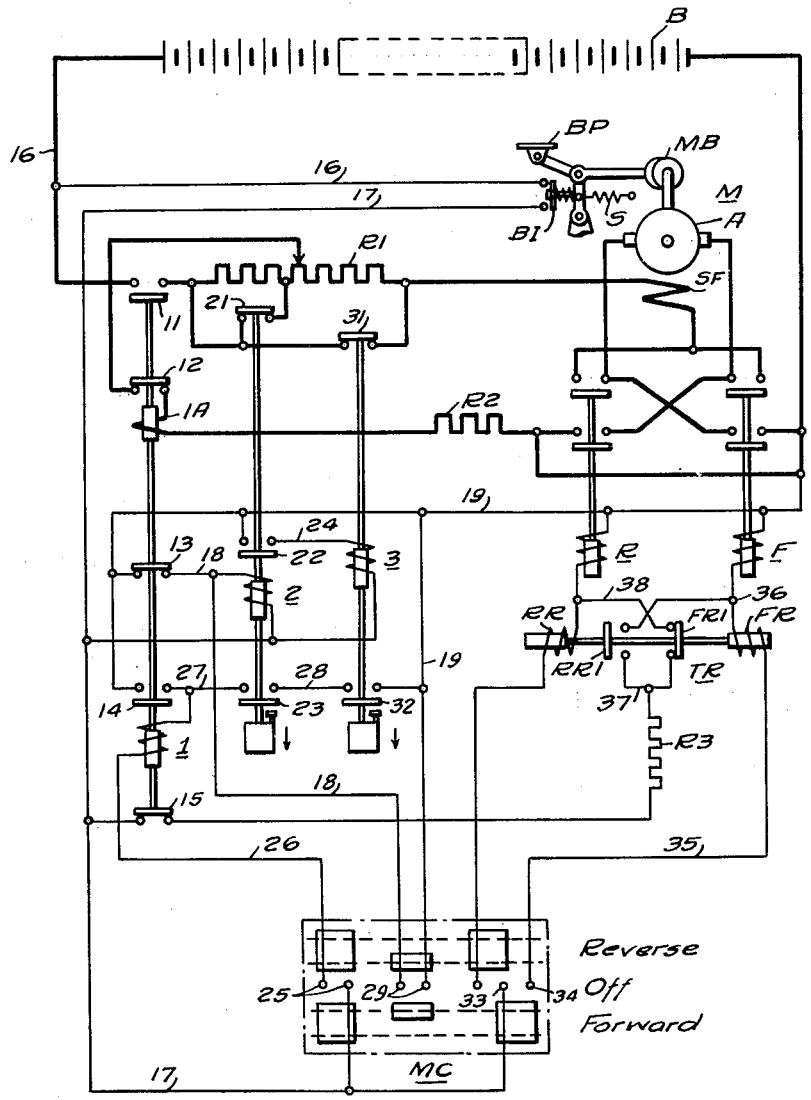
WITNESSES:
INVENTORS
Herman C. Krapf and
Edward R. Sirotak.
BY
ATTORNEY Patented May 16, 1950

2,508,175

UNITED STATES PATENT OFFICE 2,508,175

ELECTRIC MOTOR DYNAMIC BRAKING SYSTEM

Herman C. Krapf, Wilkinsburg, Pa., and Edward R. Sirotak, Cleveland, Ohio, assignors to Westinghouse Electric Corporation, East Pittsburgh, Pa., a corporation of Pennsylvania Application November 13, 1946, Serial No. 709,658

5 Claims. (Cl. 318—262)

Our invention relates, generally, to control systems and, more particularly, to systems for controlling the operation of electrically-propelled vehicles, such as, for example, battery-operated baggage trucks and the like.

An object of our invention, generally stated, is to provide a motor control system which shall be simple and efficient in operation and which may be economically manufactured and installed.

A more specific object of our invention is to provide for automatically establishing dynamic braking for a motor irrespective of its previous direction of rotation.

Another object of our invention is to automatically establish dynamic braking for a manually controlled motor when the manually operable controller is returned to a position between the forward and the reverse positions.

Other objects of our invention will be explained fully hereinafter or will be apparent to those skilled in the art.

In accordance with one embodiment of our invention, the control system for a motor is such that dynamic braking is automatically established when the controller handle is rotated in a direction opposite to that for acceleration. A transfer relay functions to set up the dynamic braking circuit irrespective of the previous direction of operation of the motor.

For a fuller understanding of the nature and objects of the invention, reference may be had to the following detailed description, taken in conjunction with the accompanying drawing in which the single figure is a diagrammatic view of a control system embodying the principal features of our invention.

Referring to the drawing, the system shown therein comprises a motor M which may be of the series type suitable for propelling a light duty truck or other vehicle (not shown), a battery B for supplying power to the motor M, a resistor R1 for controlling the motor current both during acceleration and during dynamic braking, an additional resistor R2 for controlling the dynamic braking current, a two-position switch 1 for connecting the motor to the power source in one position and for establishing a dynamic braking circuit for the motor when in the other position, reversing switches R and F for controlling the direction of current flow through the armature winding A of the motor, accelerating switches 2 and 3 for shunting the resistor R1 from the motor circuit, and a transfer relay TR which controls the operation of the reversing switches R and F during dynamic braking.

As shown, the transfer relay TR is provided with a coil FR which actuates the switch to one position when the coil is energized and a coil RR which actuates the switch to another position when this coil is energized. The switch is provided with contact members FR1 which are closed when the coil FR is energized and contact members RR1 which are closed when the coil RR is energized. It will be understood that switches of other types, such as a toggle switch, may be utilized if desired.

A master controller MC, which may be of the drum type, is provided for controlling the operation of the switches 1, 2 and 3, and the reversing switches R and F during acceleration of the motor. As shown, the controller MC is provided with an "off" position, a "forward" position located on one side of the "off" position and a "reverse" position located on the other side of the "off" position.

A mechanical brake MB is connected to the armature shaft of the motor M. The brake is applied by a spring S and may be released by a brake peddle BP. A braking interlock switch BI is so constructed that the contact members of the switch are closed when the brake peddle BP is depressed to release the mechanical brake MB.

As will be explained more fully hereinafter, the reversing switches R and F cooperate with the switch 1 in establishing the dynamic braking circuit for the motor. The operation of the reversing switches is so controlled by the transfer relay TR that the current through the series field winding SF of the motor is in the proper direction with respect to the current through the armature winding to establish dynamic braking irrespective of the direction of operation during acceleration of the motor as determined by the position of the master controller MC.

In order that the functioning of the foregoing apparatus may be more clearly understood, the operation of the system will now be described in more detail. When the operator of the vehicle depresses the brake peddle BP to release the mechanical brake MB, the interlocking switch BI is closed to energize the actuating coil of the resistor shunting switch 2. The energizing circuit may be traced from the positive terminal of the battery B, through conductor 16, the switch BI, conductor 17, the actuating coil of the switch 2, conductor 18, an interlock 13 on the switch 1, and conductor 19 to the negative terminal of the battery B. The energization of the actuating coil of the switch 2 causes contact members 21 of the switch to be opened.

Following the operation of the switch 2, the actuating coil of the switch 3 is energized through a circuit which extends from the conductor 17, through the actuating coil of the switch 3, conductor 24, an interlock 22 on the switch 2, and the conductor 19 to the negative terminal of the battery B. The energization of the actuating coil of the switch 3 causes the contact members 31 of the switch to be opened, thereby inserting the full amount of the resistor R1 in the motor circuit.

Assuming that it is desired to operate the vehicle in a forward direction, the master controller MC is actuated to the first position in the forward direction. When the master controller is in the first position, the actuating coil of the switch 1 is energized through a circuit which extends from the conductor 17 through contact members 25 of the controller MC, conductor 26, the actuating coil of the switch 1, conductor 27, an interlock 23 on the switch 2, conductor 28, an interlock 32 on the switch 3, and conductor 19 to the negative terminal of the battery B. A holding circuit for the switch 1 is established through an interlock 14 on the switch 1.

The energization of the actuating coil of the switch 1 causes the closing of the contact members 11 of the switch to connect the motor M across the battery B through the resistor R1. Following the operation of the switch 1, the actuating coil of the switch 2 is deenergized by the opening of the interlock 13 on the switch 1, provided the master controller MC is actuated to the second position to interrupt the circuit through contact members 29 on the controller. The contact members 21 of the switch 2 are closed after a predetermined time interval, thereby shunting a portion of the resistor R1 from the motor circuit.

Following the operation of the switch 2, the energizing coil of the switch 3 is deenergized by the opening of the interlock 22 on the switch 2. The contact members 31 of the switch 3 are closed after a predetermined time interval to shunt the remainder of the resistor R1 from the motor circuit. In this manner, the motor is accelerated to its full speed.

It will be noted that the actuating coil of the switch F was energized when the controller MC was actuated to the first position in the forward direction. The energizing circuit for the switch F extends from the conductor 17, through contact members 33 and 34 of the master controller, conductor 35, the coil FR of the transfer relay TR, conductor 36, the actuating coil of the switch F, and the conductor 19 to the negative terminal of the battery B. Accordingly, the reversing switch F is closed and the contact members FR1 of the transfer relay are closed at this time as shown in the drawing.

When it is desired to stop the vehicle, the master controller MC is returned to the "off" position. When the controller MC is returned to the "off" position, the actuating coil of the switch 1 is deenergized, thereby opening the contact members 11 and closing the contact members 12 of the switch. Furthermore, the interlock 15 on the switch is closed at this time, thereby energizing the actuating coil of the reversing switch R through a circuit which extends from the conductor 17, through a balancing resistor R3, conductor 37, the contact members FR1 of the transfer relay TR, conductor 38, the actuating coil of the switch R, and conductor 19 to the negative terminal of the battery B.

The closing of the contact members 12 of the switch 1 and the reversing switch R establishes a dynamic braking circuit for the motor M. The dynamic braking circuit is such that the current through the armature winding of the motor is permitted to reverse while the current through the series field winding SF continues to flow in the same direction as during acceleration of the motor. Thus the counter electromotive force of the motor causes the dynamic braking current to build up, the dynamic braking effect being controlled by the resistors R1 and R2. A holding coil 1A on the switch 1 is connected in the dynamic braking circuit, thereby causing the contact members 12 of the switch to remain closed during dynamic braking.

It will be noted that the energization of the reversing switch R when the controller MC is returned to the "off" position does not change the position of the transfer relay TR. Thus, this relay remains in the same position unless the master controller is actuated to one of the "reverse" positions to cause the energization of the actuating coil RR of the transfer relay simultaneously with the energization of the actuating coil of the reversing switch R.

In the event that the vehicle is operating in the reverse direction when the controller MC is returned to the "off" position, the actuating coil of the switch F is energized through the contact members RR1 of the transfer relay and the proper dynamic braking connections are established by the closing of the reversing switch F. Thus, the proper dynamic braking connections are established to provide the correct field excitation regardless of the direction from which the master controller handle is returned to the "off" position.

From the foregoing description, it is apparent that we have provided a system which will automatically establish dynamic braking for an electric motor irrespective of the direction of operation of the motor during acceleration. The system requires the provision of only one controller which functions to control the direction of operation of the motor and to cause the establishment of the dynamic braking connections when the controller is returned to its 'off" position.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a control system, in combination, a motor having an armature winding and a series field winding, a power conductor, reversing switches for controlling the direction of rotation of the motor armature, a switch having one set of contact members for connecting the motor to the power conductor to accelerate the motor, said switch having another set of contact members which cooperate with said reversing switches in establishing dynamic braking connections for the motor, a coil on said switch energized by the dynamic braking current to hold said second set of contact members closed during dynamic braking, and a transfer relay cooperating with said switch to control the operation of said reversing switches during dynamic braking.

2. In a control system, in combination, a motor having an armature winding and a series field winding, a power conductor, reversing switches for controlling the direction of rotation of the motor armature, a switch having one set of contact members for connecting the motor to the power conductor to accelerate the motor, said switch having another set of contact members which cooperate with said reversing switches in establishing dynamic braking connections for the motor, a coil on said switch energized by the dynamic braking current to hold said second set of contact members closed during dynamic braking, the said sets of contact members on said switch being so interlocked that when one set is closed the other set is open, and a transfer relay cooperating with said switch to control the operation of said reversing switches during dynamic braking.

3. In a control system, in combination, a motor having an armature winding and a series field winding, reversing switches for controlling the direction of current flow through the armature winding, switching means having mechanically interlocked contact members for connecting the motor to a power source to accelerate the motor and for cooperating with said reversing switches in establishing dynamic braking connections for the motor, a holding coil on said switching means energized by the dynamic braking current to maintain the dynamic braking connections, and a transfer relay cooperating with said switching means to control the operation of said reversing switches during dynamic braking.

4. In a control system, in combination, a motor having an armature winding and a series field winding, a power conductor, reversing switches for controlling the direction of rotation of the motor armature, a switch having one set of contact members for connecting the motor to the power conductor to accelerate the motor, said switch having another set of contact members which cooperate with said reversing switches in establishing dynamic braking connections for the motor, a controller having contact members for controlling the operation of said switch and said reversing switches during acceleration, a transfer relay having contact members for controlling the operation of said reversing switches during dynamic braking, and interlocking means on said switch for establishing a circuit to said contact members on the transfer relay.

5. In a control system, in combination, a motor having an armature winding and a series field winding, a power conductor, reversing switches for controlling the direction of rotation of the motor armature, a switch having one set of contact members for connecting the motor to the power conductor to accelerate the motor, said switch having another set of contact members which cooperate with said reversing switches in establishing dynamic braking connections for the motor, a controller having contact members for controlling the operation of said switch and said reversing switches during acceleration, a transfer relay for controlling the operation of said reversing switches during dynamic braking, and interlocking means on said switch for controlling the energization of said transfer relay.

HERMAN C. KRAPF.
EDWARD R. SIROTAK.

REFERENCES CITED

The following references are of record in the file of this patent:

UNITED STATES PATENTS

| Number | Name | Date |
|---|---|---|
| 1,315,774 | Jones | Sept. 9, 1919 |
| 1,924,306 | Cook et al. | Aug. 29, 1933 |
| 1,976,614 | James | Oct. 9, 1934 |
| 2,426,378 | Stanley | Aug. 26, 1947 |